Jan. 23, 1940.　　　A. W. DAVIS　　　2,187,731

FLAME CUTTING METHOD AND MACHINE

Filed April 24, 1937

INVENTOR
ARTHUR W. DAVIS
BY
*E. L. Greenewald*
ATTORNEY

Patented Jan. 23, 1940

2,187,731

UNITED STATES PATENT OFFICE 2,187,731

FLAME CUTTING METHOD AND MACHINE

Arthur W. Davis, Lakewood, Ohio, assignor to The Linde Air Products Company, a corporation of Ohio Application April 24, 1937, Serial No. 138,713

7 Claims. (Cl. 266—23)

This invention relates to a flame cutting method and a machine, such as a self-propelled heat-applying machine which may be used to make long cuts without employing the usual track. The invention is especially useful in its application to "splitting" I-beams or H-bars, to which use, however, it is not limited.

In repeatedly causing a self-propelled heat-applying machine to follow a non-circular path of regular form, as in making repeated straight cuts, it is usual to provide the machine with flanged wheels and to mount it upon a track. When the machine is to be used upon work pieces of great length, such tracks are necessarily heavy, inconvenient, and expensive, and take up considerable floor space. It is accordingly uneconomical to use a heat applying machine with such a track where a small number of such long work pieces are to be treated.

One object of the invention is, therefore, to provide means for guiding a self-propelled heat-applying or flame cutting machine along a convenient surface, thereby making it unnecessary to use a special track. Another object is to provide such means in a form which will permit easy, accurate, and certain alignment between the path of the machine and the required line of heat application. A further object is the provision of such means in simple, convenient, and economical form. A still further object of the invention is to provide a method of cutting an I-beam or the like longitudinally in which the cutting apparatus is supported on and guided by the I-beam itself, thus dispensing with the necessity for a special track for the apparatus.

Figure 1:
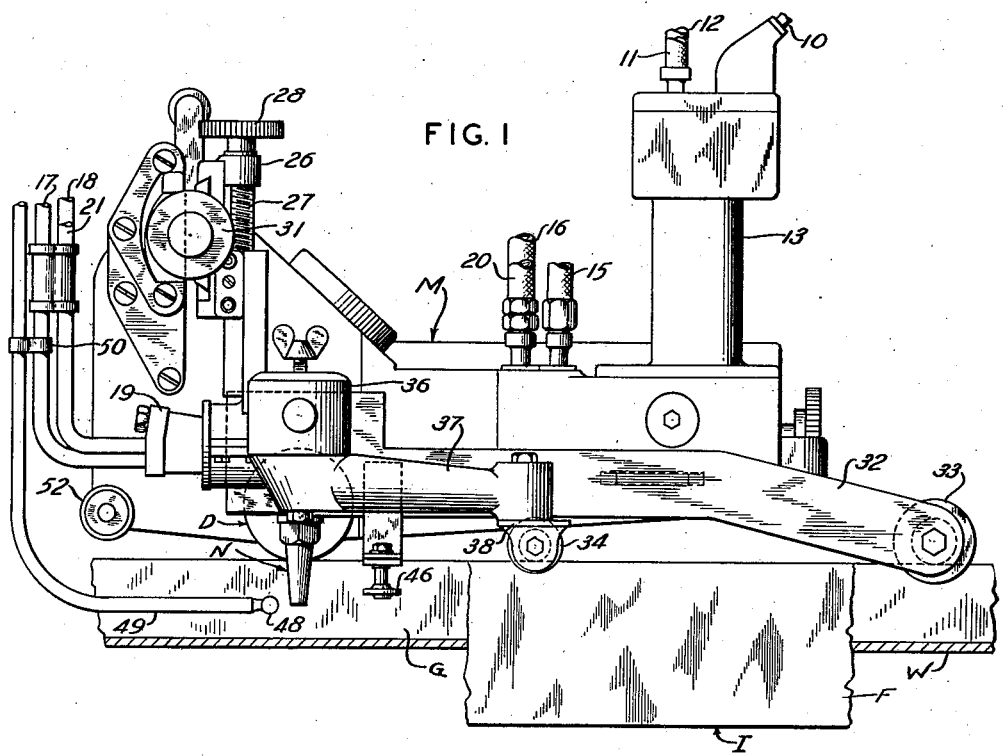
Figure 2:
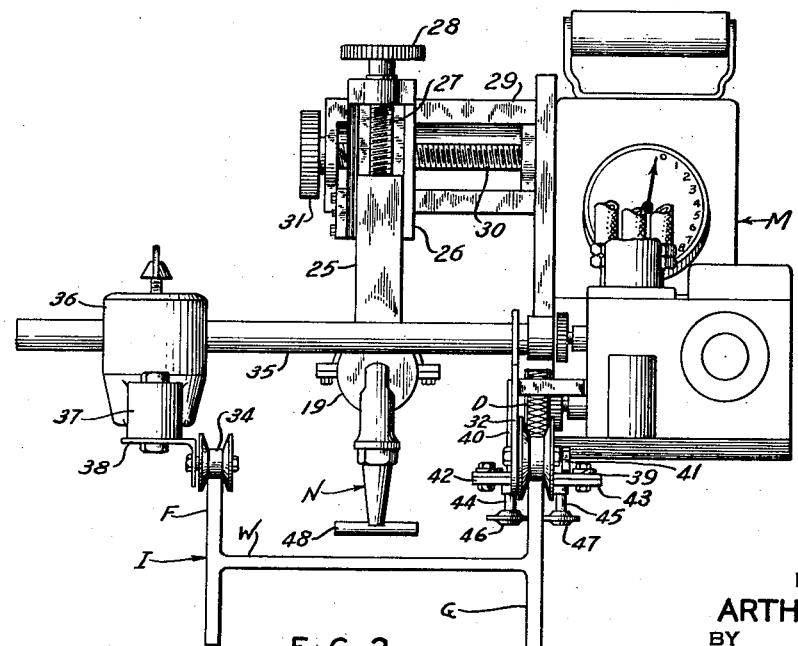

Other objects and novel features of the invention will be apparent from the following description taken with the accompanying drawing, in which;

Fig. 1 is a side elevation of an apparatus embodying the invention together with an associated work piece which is shown partly in elevation and partly in section; and Fig. 2 is a front elevation of the apparatus and the work piece, a part of the apparatus being broken away.

According to the present invention the usual track, which supports a self-propelled heat-applying machine when effecting repeated operations of appreciable length, is dispensed with, and the machine is sustained on a temporary support. Furthermore, the machine is provided with one or more guide wheels which make continuous lateral contact with a fixed longitudinal member in order to guide the machine along the support. The support may be a part of the work piece upon which the machine operates, or it may be an adjacent work piece; and the fixed longitudinal member may be a part of the work piece being treated or a non-horizontal face of the support.

For convenience the invention will be described in its application to a flame-cutting machine which operates to "split" an I-beam by cutting the same longitudinally of its web midway between the two flanges. For further convenience the gases used by the machine will be designated as "oxygen" and "acetylene" thereby denoting respectively any appropriate cutting and combustion supporting gas and any appropriate fuel gas.

As illustrated in Figs. 1 and 2 of the drawing, an I-beam I is disposed with its web W in substantially a horizontal plane and its two flanges F and G standing substantially vertically. A self-propelled heat-applying machine, here shown as a cutting machine M, is propelled by a driving wheel D along the upper edges of the flanges F and G in such a manner as to move a cutting nozzle N longitudinally of the I-beam I midway between the two flanges and immediately above the center of the web W.

The machine M is of well-known construction, being supplied with electric current through a cable 10 and with oxygen and acetylene through hoses 11 and 12 respectively, all connected to the machine at the top of a turret 13 thereon. The turret 13 is of sufficient height to keep a substantial section at the ends of the cable and the hoses clear of the machine. The current supplied through the cable 10 energizes a motor (not shown) at the back of the machine which operates the driving wheel D. The oxygen supplied to the machine through the hose 11 is divided in the machine into cutting oxygen, and combustion supporting oxygen, and passes through external hoses 15 and 16 to conduits 17 and 18 through which it is carried to a blowpipe 19 supporting the cutting nozzle N. Acetylene passes from the machine through an external hose 20, and through a conduit 21 which is also connected to the blowpipe 19.

Provision is made for adjusting the vertical position of the nozzle N with respect to the machine M. Thus, the blowpipe 19 is carried by a member 25, which is slidable in a vertical guide member 26. A screw 27, journaled at the top of the guide member 26, engages internal threads in the member 25, so that turning a wheel 28 at the end of the screw will raise or lower the member 25 in the vertical guide, thereby adjusting the vertical position of the blowpipe and with it the nozzle N. To permit adjustment of the horizontal position of the nozzle N, the vertical guide member 26 is slidable in a horizontal guide member 29 which extends from the machine M at right angles to the line of its travel. A horizontal screw 30 is journalled in the horizontal guide member 29 and is turned by a knurled wheel 31 at its outer end. The screw 30 coacts with the vertical guide member in well-known manner to move the latter horizontally along the horizontal guide member 29 when the wheel 31 is turned. Thus the vertical and horizontal position of the blowpipe 19, and with it the nozzle N, may be adjusted at will by manipulating the wheels 28 and 31.

The driving wheel D is journalled to the machine M at one side thereof, and may propel the machine by moving along the upper surface of the flange G. A plurality of idler wheels are also journalled to the machine for additionally supporting it. Thus, a bracket 32 is carried by the machine M on the same side thereof as is the driving wheel D, and this bracket extends forwardly of the machine having a flanged wheel 33 journalled at its forward end in line with the driving wheel D for rolling along the top of the vertical flange G ahead of the driving wheel. Another flanged wheel 34 travels along the upper edge surface of the vertical flange F and is connected to the machine M through the radius rod 35 which is used when the machine is employed for cutting circles. Thus the radius rod is attached to the machine in the usual manner, extending therefrom at right angles to the line of travel of the machine. The usual counterweight 36 is slidably mounted on the radius rod with its arm 37 extending forwardly in the direction of travel; and an angle 38 is fastened to the arm 37 in place of the usual center pin or point. The wheel 34 is journalled to this bracket, and the position of the counterweight is adjusted on the radius rod so that the wheel 34 will travel along the top edge of the flange F. The counterweight 36 thus balances that part of the apparatus which is on the other side of the flange G, and the idler wheels 33 and 34, together with the driving wheel D, sustain the apparatus on the I-beam I.

If no means were provided to give the apparatus greater lateral stability, the wheels 33 and 34 might possibly ride up on their flanges and leave the top of the I-beam flanges F and G. Accordingly a bracket is provided which is made fast to the machine M and which carries one or more guide wheels journalled for continuous rolling contact with a flange of the I-beam to guide the machine. The bracket illustrated in Figs. 1 and 2 comprises a horizontal member 39 which is disposed transversely beneath the machine M just above the lowest level defined by the tread of the driving wheel D and the flanged wheel 33. The member 39 is attached to the machine by means of an angle member 40 having one leg welded to the bracket 32 and the other leg welded to the upper surface of the member 39 at its end, and by means of a bent member 41 having one part welded to the lower side of the machine and another part welded to the opposite end of the member 39. Small plates 42 and 43, carrying vertical axles 44 and 45 respectively, are bolted to the under side of the member 39 at its respective ends. A guide wheel 46 is journalled on the axle 44 in a position to make continuous lateral rolling contact with a longitudinal fixed member, here the inner face of the flange G, to guide the machine. Similarly, a wheel 47 is journalled on the axle 45 for making continuous lateral rolling contact with another longitudinal fixed member to guide the machine. As here shown, the latter member is the outside of the flange G. The guide wheels 46 and 47 act to keep the driving wheel D upon the flange G. Clearly the fastening bolts may be loosened and the small plates 42 and 43 may be turned about them to give the axles 44 and 45, together with the respective wheels 46 and 47, slight lateral adjustment. Furthermore, both the wheel 46 and the wheel 47 roll upon the support thereby guiding the movement of the machine in a lateral sense.

From the foregoing, operation of the machine which has just been described will be obvious. An I-beam, to be cut is placed in position with its flanges standing vertically. The machine is then placed upon the I-beam I at one end thereof with the wheel 34 on the top of the flange F, and with the wheel 33 and the driving wheel D on top of the flange G, the counterweight 36 being adjusted on the radius rod 35 and the angle 38 being adjusted in order to position the wheel 34 accurately. The small plates 42 and 43 are turned so that the wheels 46 and 47 bear against the proper longitudinal fixed members, here the inside and outside, respectively, of the flange G, and the bolts fastening the plates are then tightened. Thus the apparatus is supported on the flanges of the beam I. Proper horizontal and vertical adjustment is next given the nozzle N by turning the wheels 31 and 28. The heating gas mixture is then turned on in order to heat to the kindling temperature a small area of the web W at the point at which the cutting operation is to be started. When this small area has been heated to the proper temperature, the cutting oxygen is turned on and the motor is started. Thereupon the machine will travel the length of the I-beam I making the proper cut in the web W. As the apparatus moves along the flanges, it is guided by rolling contact between the vertical faces on the flange G and the wheels 46 and 47 respectively. Meanwhile another I-beam may be positioned beyond the I-beam I, so that upon completion of the cut the machine may roll upon the second I-beam and may continue the desired cut in its web.

In order to prevent distortion of the web W as it is being cut, provision may be made for projecting a spray of cooling fluid upon it immediately behind the cut. Thus a spray conduit 48 is positioned immediately behind the nozzle N in horizontal position and extending across the line of travel of the nozzle. Openings in the lower side of the conduit 48 provide means for projecting a spray downwardly upon the web W immediately following the cutting operation. The spray conduit 48 is supported by a supply pipe 49 which carries cooling fluid thereto. The spray conduit 48 and the supply pipe 49 are rigidly connected together, and the supply pipe 49 is held against the gas supply conduit 17 by a clamp or bracket 50. Since the gas supply conduit, the blowpipe 19 and the nozzle N all move together, it follows that horizontal and lateral adjustment of the nozzle N by manipulation of the handles 31 and 28 will necessarily adjust the spray conduit 48 likewise.

From the foregoing, it is evident that the invention does in fact make unnecessary the use of a special track, and also that it permits easy, accurate and certain alignment between the path of the machine and the required line of application of heating or cutting medium.

The form of the invention which is herein described is disclosed merely to indicate how the invention may be applied. Other forms, differing in detail but not in principle from those here shown and described, will, of course, suggest themselves to those skilled in the art.

I claim:

1. A method of cutting an I-beam or the like longitudinally, comprising supporting an apparatus on the flanges of the beam; propelling the apparatus along the flanges during the cutting operation; guiding the apparatus by rolling contact with at least one flange of the beam; projecting a jet of oxidizing gas from the propelled apparatus against the web of said beam; and projecting a cooling spray upon the cut edges immediately behind the jet of oxidizing gas so as to prevent distortion of the beam.

2. A self-propelled machine for longitudinally cutting an I-beam or the like, comprising a driving wheel and an idler wheel disposed at one side of the body of said machine for rolling engagement with the top edge of a first vertically positioned flange of said I-beam, the body of said machine projecting beyond said flange on the side opposite the web of said beam; guide wheels rotatably mounted to said machine for rolling engagement with opposite sides of said first flange; a substantially horizontal rod projecting at one end from the body of said machine and extending over the web of said I-beam toward the second vertically positioned flange of said I-beam; a wheel support slidably mounted on said rod, said support thereby being adapted to be positioned for rolling engagement with the top edge of said second flange; and a blowpipe secured to said machine and being directed against said beam whereby when said driving wheel rotates on said first flange said blowpipe is progressively directed against successive portions longitudinally of said I-beam.

3. In a self-propelled machine for cutting the web of an I-beam or the like longitudinally while said beam is disposed horizontally with its flanges in a vertical position, a driving wheel rolling upon the top of one of said flanges; an idler wheel rolling upon the top of the other of said flanges; an idler wheel rolling upon the top of said first-mentioned flange; a pair of guide wheels in lateral contact with said first-mentioned flange; and a cutting blowpipe carried by said machine.

4. In a self-propelled machine for cutting the web of an I-beam or the like longitudinally while said beam is horizontally disposed with its flanges in a vertical position, a driving wheel rolling upon the top of one of said flanges; an idler wheel rolling upon the top of the other of said flanges; an idler wheel rolling upon said first-mentioned flange; a pair of guide wheels in lateral contact with said first-mentioned flange; a blowpipe carried by said machine for cutting said web longitudinally, the nozzle of said blowpipe extending below the top of said flanges; and means adjacent to said nozzle operatively associated with said machine for directing a spray of cooling fluid upon the web of said beam immediately after the cutting thereof so as to prevent distortion of said beam.

5. In a self-propelled heat-applying machine, a driving wheel journalled to the machine at one side thereof for sustaining and propelling the same and rolling on a vertical portion of a support, a bracket attached to the side of the machine in horizontal position adjacent said driving wheel, and a flanged wheel and guide wheels carried by said bracket and respectively in contact with the top and sides of the vertical portion of said support for sustaining and guiding the machine, in combination with a substantially horizontal rod fixed at one end to the machine and extending substantially at right angles to its direction of travel, an adjustable member carried by said rod, and a flanged idler wheel carried by said member in rolling contact with a part of the support parallel to said vertical portion.

6. In a self-propelled heat-applying machine, a driving wheel journalled to the machine at one side thereof for sustaining and propelling the same on a first support, the body of said machine projecting beyond said support, a flanged wheel rotatably mounted to said machine in contact with the part of the support upon which said driving wheel operates for sustaining and guiding the machine, a substantially horizontal rod fixed at one end to the machine and extending from the side adjacent to said driving wheel substantially at right angles to its direction of travel, an adjustable member carried by said rod, to counterbalance the projection of said machine beyond said support, a flanged idler wheel carried by said member for rolling contact with a second support parallel to the first support, and two guide wheels each journalled with respect to said machine to engage the vertical faces of said first support.

7. A method of cutting an I-beam or the like longitudinally, said method comprising locating the beam with the flanges thereof vertical, supporting an apparatus on the flanges of the beam, moving the apparatus along the flanges during the cutting operation, guiding the apparatus by rolling contact with opposite faces of one flange of the beam, and projecting a jet of oxidizing gas from the moving apparatus against the web of said beam.

ARTHUR W. DAVIS.